United States Patent Office 3,531,480
Patented Sept. 29, 1970

3,531,480
PHENOTHIAZINE DERIVATIVES
Ernst Jucker, Ettingen, Anton Ebnöther, Reinach, Basel-Land, and Erwin Rissi, Basel, Switzerland, assignors to Sandoz Ltd. (also known as Sandoz A.G.), Basel, Switzerland
No Drawing. Filed Apr. 17, 1968, Ser. No. 721,949
Claims priority, application Switzerland, Apr. 19, 1967, 5,589/67; Dec. 6, 1967, 17,056/67
Int. Cl. C07d 93/14
U.S. Cl. 260—243                               8 Claims

ABSTRACT OF THE DISCLOSURE

The invention provides phenothiazine derivatives of the formula:

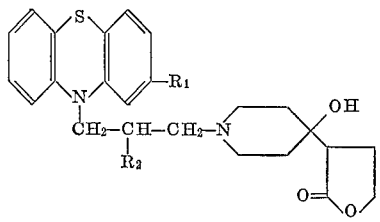

wherein $R_1$ is hydrogen, chlorine, bromine, trifluoromethyl, cyano or lower alkanoyl, and $R_2$ is hydrogen or methyl, and pharmaceutically acceptable acid addition salts thereof.

---

The phenothiazine derivatives are useful sedative neuroleptic agents.

The present invention relates to new phenothiazine derivatives and processes for their production.

The present invention provides phenothiazine derivatives of the general Formula I,

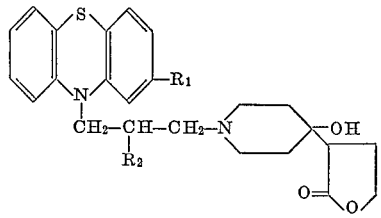

in which $R_1$ signifies a hydrogen, chlorine or bromine atom, the trifluoromethyl, cyano or a lower alkanoyl radical, and $R_2$ signifies a hydrogen atom or a methyl radical, and their salts with inorganic or organic acids.

The present invention further provides the following processes for the production of phenothiazine derivatives of Formula I and their acid addition salts:

(a) A compound of Formula II,

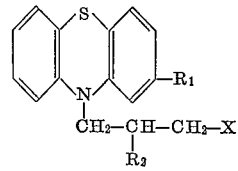

in which $R_1$ has the above-significance except formyl and $R_2$ has the above significance, and X signifies chlorine, bromine, iodine or a radical of an organic sulphonic acid, e.g. p-toluenesulphonic acid, is heated with 4-hydroxy-(2-oxo-3-tetrahydrofuryl)piperidine of Formula III,

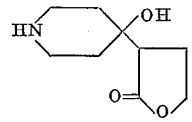

in the presence of an acid binding agent, or (b) a compound of Formula IV,

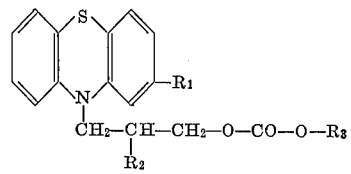

in which $R_1$ and $R_2$ have the above significance, and $R_3$ signifies a lower alkyl radical, is heated with a piperidine derivative of the above Formula III, or (c) a compound of Formula V,

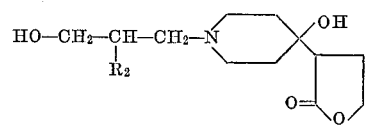

in which $R_2$ has the above significance, is acylated with a carboxylic acid chloride of Formula VI,

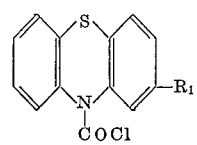

in which $R_1$ has the above significance, in the presence of an acid binding agent, and the resulting ester of Formula VII,

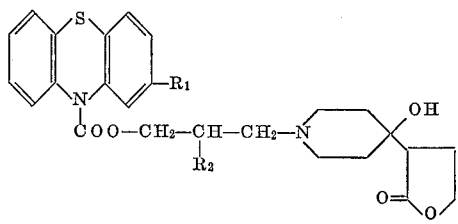

in which $R_1$ and $R_2$ have the above significance, is decarboxylated by heating, or (d) a compound of Formula VIII,

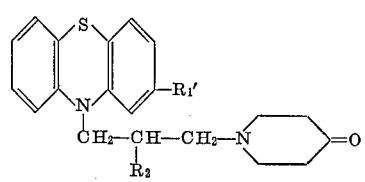

in which $R'_1$ signifies a hydrogen, chlorine or bromine atom or the trifluoromethyl radical, and $R_2$ has the above significance, is reacted in an inert solvent with a γ-butyrolactone, in the presence of an alkali metal amide, whereby a compound of Formula Ia,

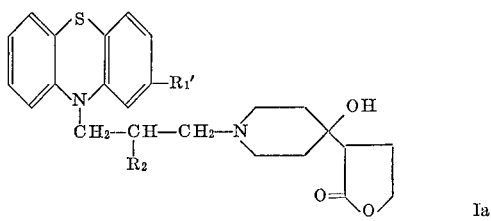

in which $R'_1$ and $R_2$ have the above significance, is obtained.

The phenothiazine derivatives of Formula I obtained by the above process may then optionally be converted into the corresponding salts by reacting with inorganic or organic acids.

The processes may, for example, be effected as follows:

(a) 2-chloro - 10 - (3-mesyloxypropyl)-phenothiazine, 2-acetyl - 10 - (3-chloropropyl)-phenothiazine, 2-bromo-10-(3-chloropropyl) - phenothiazine, 10 - (3 - chloropropyl)-phenothiazine, 2-trifluoromethyl - 10 - (3-chloropropyl)-phenothiazine, 2-cyano - 10 - (3-chloropropyl)-phenothiazine and 2-chloro - 10 - (3-chloro-2-methylpropyl)-phenothiazine may, for example, be used as starting materials of Formula II. A compound of Formula II and a compound of Formula III are heated for 10–50 hours in absolute toluene, absolute xylene or in another anhydrous organic solvent, e.g. to the boil at reflux while stirring at normal pressure or in a bomb tube to temperature of 130–180° C. An inorganic base, e.g. potassium carbonate, a tertiary organic base or a second mol of compound III may be used as acid binding agent.

(b) 2-chloro-10-(3-ethoxycarbonyloxypropyl)-phenothiazine may, for example, be used as starting material of Formula IV. A compound of Formula IV is heated with 4-hydroxy-4-(2-oxo - 3 - tetrahydrofuryl) - piperidine of Formula III to a temperature of 150–200° C. for an extended period, e.g. 6 hours. The reaction may optionally be effected in a high boiling (B.P. 150–200° C.) inert organic solvent and optionally in the presence of a catalytic amount of metallic sodium.

(c) The carboxylic acid ester of Formula VII is obtained by acylating a compound of Formula V in the presence of an acid binding agent, e.g. potassium carbonate, with a carboxylic acid chloride of Formula VI. The reaction may, for example, be effected in absolute toluene while stirring at the boil at reflux for about 15–20 hours. Decarboxylation is effected by heating the ester VII to about 190° C. for 3–5 hours, preferably in the presence of copper powder; this reaction may, for example, be effected in a high vacuum without solvent or in a high boiling organic solvent at normal pressure.

(d) A compound of Formula Ia may, for example, be obtained as follows: γ-butyrolactone in a solvent, e.g. tetrahydrofuran, and a compound of Formula VIII are added to a suspension of an alkali metal amide, e.g. lithium amide, in liquid ammonia and/or absolute ether or absolute dioxane and the mixture is stirred for about 3 hours. The ammonia is then allowed to evaporate, an inert organic solvent, such as absolute toluene, is added and the mixture is stirred for an extended period, e.g. 20 hours, first at room temperature and subsequently at about 100° C., in order to complete the reaction. A compound such as 2-chloro-10-[3-(4-oxopiperidino)propyl]-phenothiazine may, for example, be used as starting material of Formula VIII.

The compounds of Formula I produced in accordance with the above processes may be isolated from the reaction mixture in the usual manner and purified in manner known per se, e.g. by crystallization, absorption chromatography or salt formation. They are basic compounds and with inorganic or organic acids form stable salts which crystallize at room temperature. Examples of acids for acid salt formation are hydrochloric, hydrobromic, sulphuric, malonic, succinic, fumaric, p-toluenesulphonic and cyclohexylsulphamic acid.

The piperidine derivatives of Formula III and V used as starting materials have hitherto not been described in the literature; these compounds and the processes for their production described below also form part of the present invention:

γ-butyrolactone is added to 1-benzyl-4-piperidone in the presence of an alkali metal amide, e.g. lithium amide, in liquid ammonia and/or absolute ether or absolute dioxane, and the resulting 1-benzyl-4-hydroxy-4-(2-oxo-3-tetrahydrofuryl)-piperidine is debenzylated to give 4-hydroxy-4-(2-oxo-3-tetrahydrofuryl)-piperidine of Formula III, e.g. by hydrogenation in glacial acetic acid in the presence of a palladium catalyst at a slightly elevated pressure and at an elevated temperature, for example 6 atm./60°.

Compounds of Formula V are obtained by reacting 4-hydroxy - 4 - (2-oxo-3-tetrahydrofuryl)-piperidine (III) in the presence of an acid binding agent, e.g. potassium carbonate, with a compound of Formula IX,

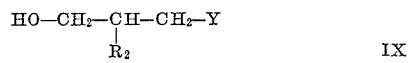

in which Y signifies chlorine or bromine, and $R_2$ signifies hydrogen or the methyl radical.

The compounds of Formula II are known or may be obtained from a corresponding phenothiazine of Formula X,

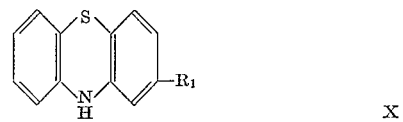

in which $R_1$ has the above significance, in manner known per se, e.g. by reacting with a compound of Formula XI,

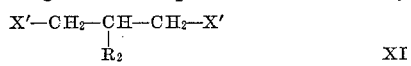

in which $R_2$ signifies hydrogen or the methyl radical, and X' signifies chlorine, bromine or iodine, or with compounds of Formula IX, in the presence of sodium amide in liquid ammonia, and subsequently treating the 3-hydroxypropyl-phenothiazines obtained in the second case with thionyl chloride, phosphorus tribromide or p-toluene-, methane- or ethanesulphonyl chloride. The compounds of Formula IV are obtained from the above 3-hydroxypropyl-phenothiazines by reacting with a lower alkyl ester of chloro- or bromoformic acid in the presence of an acid binding agent, e.g. sodium ethylate or potassium carbonate. Some of the compounds of Formula VIII are unknown and may, for example, be produced by reacting the piperidone-(4)-ethyleneketal in the presence of an acid binding agent, e.g. potassium carbonate, with a corresponding phenothiazine of Formula IIa,

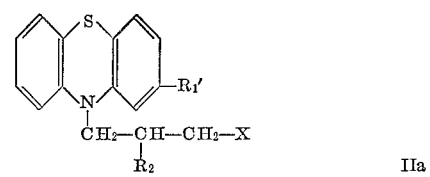

in which $R_1'$ (and X) have the above significance, and subjecting the resulting product to an acid hydrolysis.

The phenothiazine derivatives of the present invention have been found to be useful sedative neuroleptic agents. The phenothiazine derivatives of the present invention have been found effective in the pharmacological tests involving measurement of potentiation of barbiturate narcosis, inhibition of spontaneous and amphetamine-induced motor activity, and inhibition of conditioned and emotional reactions. These pharmacological tests are well established and involve the use of rats and/or mice.

Monkeys are particularly suitable for further observation of sedative neuroleptic activity of compounds, and from tests carried out on such animals, the value and usefulness of the phenothiazine derivatives of the present invention are additionally confirmed. Daily dosages ranging from 0.5 to 10 mg./kg. animal body weight have been found suitable for exhibiting the sedative neuroleptic properties.

The phenothiazine derivatives of the present invention have furthermore shown favorable results in acute and subacute toxicity studies. For example, in addition to determining the usual acute toxicity value in rats ($LD_{50}$ value), oral dosages of 30 mg./kg. have been employed in subacute symptomatic toxicity trials in dogs, all dogs recovering after the experiments, thus showing the safety of the compounds.

The phenothiazine derivatives of the present invention are to be used in similar manner and at similar dosage levels as perphenazine. They have the advantage of possessing of quicker onset of action and a more potent neuroleptic effect than perphenazine.

The compounds of Formula I and their water soluble physiologically tolerated acid addition salts may be used as pharmaceuticals on their own or in the form of appropriate medicinal preparations, e.g. tablets, dragées, injectable solutions and suppositories, for administration e.g. enterally or parenterally.

Aside from the usual inorganic or organic pharmacologically inert adjuvants, e.g. lactose, starch, talcum, stearic acid, water, alcohols, glycerin, natural or hardened oils and waxes, these preparations may also contain suitable preserving, stabilizing and wetting agents, solubilizers, sweetening and colouring substances and flavourings.

The term "in manner known per se" as used herein designates methods in use or described in the literature on the subject.

In the following non-limitative examples all temperatures are indicated in degrees centigrade and are uncorrected.

EXAMPLE 1.—2 - chloro-10-{3-[4-hydroxy-4-(2-oxo-3-tetrahydrofuryl)piperidino]propyl}phenothiazine A mixture of 9.5 g. of 2-chloro-10-(3-mesyloxypropyl) phenothiazine, 4.75 g. of 4-hydroxy-4-(2-oxo-3-tetrahydrofuryl)piperidine and 10.6 g. of potassium carbonate in 120 cc. of absolute toluene is heated to the boil while stirring for 17 hours. The reaction mixture is subsequently filtered, the filter residue is taken up in water and is extracted twice with chloroform. The above filtrate is washed with water until neutral, is combined with the chloroform extract, drying over sodium sulphate and evaporation at reduced pressure are effected and the crude 2 - chloro-10-{3-[4-hydroxy-4-(2-oxo-3-tetrahydrofuryl)-piperidino]propyl}phenothiazine obtained as residue is crystallized from benzene. M.P. 152–154°.

The 4 - hydroxy-4-(2-oxo-3-tetrahydrofuryl)piperidine used as starting material is produced as follows:

(a) 1-benzyl-4-hydroxy-4-(2-oxo-3-tetrahydrofuryl) piperidine

A mixture of 37.8 g. of 1-benzyl-4-piperidone and 68.8 g. of γ-butyrolactone is added dropwise to a suspension of lithium amide (produced from 2.8 g. of lithium) in 700 cc. of liquid ammonia. The mixture is stirred for 1 hour at the temperature of the liquid ammonia and the ammonia is then allowed to evaporate with the simultaneous dropwise addition of 500 cc. of toluene. 200 cc. of a 20% aqueous ammonium chloride solution are subsequently added dropwise to the reaction mixture and the organic layer is separated. The aqueous phase is filtered through diatomaceous earth and extracted once with toluene; the combined organic phases are dried over sodium sulphate and concentrated by evaporation. The crude 1 - benzyl-4-hydroxy-4-(2-oxo-3-tetrahydrofuryl) piperidine obtained as residue is recrystallized from benzene/petroleum ether and has a M.P. of 108–109°.

(b) 4-hydroxy-4-(2-oxo-3-tetrahydrofuryl)piperidine 9.7 g. of 1-benzyl-4-hydroxy-4-(2-oxo-3-tetrahydrofuryl)-piperidine are dissolved in 100 cc. of glacial acetic acid and hydrogenated in the presence of 1.0 g. of a palladium catalyst (10% on charcoal) at an initial pressure of 6 atm. and a temperature of 60°. The taking up of hydrogen is completed after 5 hours. The catalyst is filtered off, the filtrate is concentrated by evaporation at reduced pressure, the viscous residue is taken up in 200 cc. of chloroform and a solution of 70 g. of potassium carbonate in 70 cc. of water is added to the resulting solution while stirring vigorously. The mixture is stirred for 15 minutes, is subsequently filtered through diatomaceous earth, the organic phase of the filtrate is separated and the aqueous phase is extracted twice with chloroform. The combined chloroform extracts are dried over sodium sulphate and concentrated by evaporation; the crystalline residue is dried in a high vacuum at 70°. Crude 4-hydroxy-4-(2-oxo-3-tetrahydrofuryl)-piperidine, having a M.P. of 138–140°, is obtained and is further worked up without purification.

EXAMPLE 2.—2 - acetyl-10-{3-[4-hydroxy-4-(2-oxo-3-tetrahydrofuryl) - piperidino]propyl}phenothiazine hydrobromide A mixture of 13.1 g. of 2-acetyl-10-(3-chloropropyl) phenothiazine, 7.6 g. of 4-hydroxy-4-(2-oxo-3-tetrahydrofuryl)piperidine and 17.1 g. of potassium carbonate in 200 cc. of absolute xylene is heated to the boil while stirring for 17 hours. The reaction mixture is subsequently filtered, the filtrate is washed with water until neutral and is repeatedly extracted with a 10% aqueous tartaric acid solution. The acid extracts are made alkaline with potassium carbonate while cooling with ice and the liberated base is taken up in chloroform. In order to purify the crude product it is adsorbed on a twenty-fold quantity of aluminium oxide. Elution is first effected with a mixture of benzene/chloroform 7:3 and subsequently with chloroform. The chloroform eluate is concentrated by evaporation, the residue is dissolved in acetone and is converted into the hydrobromide by the addition of a solution of hydrogen bromide in glacial acetic acid. After recrystallizing twice from acetone pure 2-acetyl-10-{3-[4-hydroxy-4-(2-oxo - 3 - tetrahydrofuryl)piperidine]propyl}phenothiazine hydrobromide, having a M.P. of 130–135° (slight decomposition), is obtained.

EXAMPLE 3.—2-bromo-10-{3-[4-hydroxy-4-(2-oxo-3-tetrahydrofuryl)-piperidino]propyl}phenothiazine Pure 2-bromo-10-{3-[4-hydroxy-4-(2-oxo-3-tetrahydrofuryl)-piperidino]propyl}phenothiazine, having a M.P. of 147–149°, is obtained in accordance with the process described in Example 2 from 21.25 g. of 2-bromo-10-(3-chloropropyl)phenothiazine, 11.1 g. of 4-hydroxy-4-(2-oxo-3-tetrahydrofuryl)piperidine and 24.9 g. of potassium carbonate in 250 cc. of absolute xylene, after chromatographic purification as indicated in Example 2 and recrystallization from acetone and from chloroform/petroleum ether.

EXAMPLE 4.—10-{3-[4-hydroxy-4-(2-oxo-3-tetrahydrofuryl)-piperidino]propyl}phenothiazine Crude 10 - {3-[4-hydroxy-4-(2-oxo-3-tetrahydrofuryl) piperidino]propyl}phenothiazine is obtained in accordance with the process described in Example 2 from 13.1 g. of 10-(3-chloropropyl)phenothiazine, 8.8 g. of 4-hydroxy-4-(2-oxo-3-tetrahydrofuryl)piperidine and 19.8 g. of potassium carbonate in 200 cc. of absolute xylene. The pure product is obtained without chromatographic purification after recrystallizing twice from acetone. It has a M.P. of 117–119°.

EXAMPLE 5.—10-{3-[4-hydroxy-4-(2-oxo-3-tetrahydrofuryl)piperidino] - propyl}-2-trifluoromethylphenothiazine Crude 10 - {3-[4-hydroxy-4-(2-oxo-3-tetrahydrofuryl)-piperidino]-propyl}-2-trifluoromethylphenothiazine is obtained in accordance with the process described in Example 2 from 26 g. of 10-(3-chloropropyl)-2-trifluoromethylphenothiazine, 14.0 g. of 4-hydroxy-4-(2-oxo-3-tetrahydrofuryl)piperidine and 31.4 g. of potassium carbonate in 300 cc. of absolute xylene. The crude product is adsorbed on a ten-fold quantity of aluminium oxide, elution is first effected with a mixture of benzene/petroleum ether 1:1 and subsequently with benzene and benzene/chloroform 1:1. The residue obtained after concentrating the benzene and benzene/chloroform eluates by evaporation is recrystallized twice from a mixture of acetone/petroleum ether and has a M.P. of 113–114°.

EXAMPLE 6.—2-cyano-10-{3-[4-hydroxy-4-(2-oxo-3-tetrahydrofuryl)-piperidino]propyl}phenothiazine Pure 2-cyano-10-{3-[4-hydroxy-4-(2-oxo-3-tetrahydrofuryl)-piperidino]propyl}phenothiazine is obtained in accordance with the process described in Example 2 and subsequent chromatographic purification as indicated in Example 5 from 7.0 g. of 2-cyano-10-(3-chloropropyl)-phenothiazine, 4.3 g. of 4-hydroxy-4-(2-oxo-3-tetrahydrofuryl)piperidine and 9.7 g. of potassium carbonate in 100 cc. of absolute xylene, after recrystallization from acetone/petroleum ether. M.P. 131.5–134°.

EXAMPLE 7.—2-chloro-10-{3-[4-hydroxy-4-(2-oxo-3-tetrahydrofuryl)-piperidino] - 2 - methylpropyl} phenothiazine Crude 2 - chloro-10-{3-[4-hydroxy-4-(2-oxo-3-tetrahydrofuryl)-piperidino]-2-methylpropyl}phenothiazine is obtained in accordance with the process described in Example 2 from 24.0 g. of 2-chloro-10-(3-chloro-2-methylpropyl)phenothiazine, 13.7 g. of 4-hydroxy-4-(2-oxo-3-tetrahydrofuryl)piperidine and 30.7 g. of potassium carbonate in 300 cc. of absolute xylene. The crude product is adsorbed on a ten-fold quantity of aluminium oxide, elution is first effected with benzene/petroleum ether 1:4 and subsequently with benzene. The residue obtained after concentrating the benzene eluate by evaporation is recrystallized twice from acetone/petroleum ether and has a M.P. of 183–185° (strong sintering above 173°).

EXAMPLE 8.—2-chloro-10-{3-[4-hydroxy-4-(2-oxo-3-tetrahydrofuryl)piperidino]propyl}phenothiazine A solution of 36.2 g. of 2-chloro-10-[3-(4-oxopiperidino)propyl]-phenothiazine and 48 g. of γ-butyrolactone in 200 cc. of absolute tetrahydrofuran is added dropwise to a suspension of lithium amide in liquid ammonia (produced from 1.4 g. of lithium in 700 cc. of liquid ammonia). After stirring for 3 hours the ammonia is allowed to evaporate and 500 cc. of absolute toluene are added. The reaction mixture is then stirred at room temperature for 17 hours and at 100° for 4 hours and is subsequently treated with 300 cc. of a 20% ammonium chloride solution. The organic phase is separated, washed with water until neutral and is concentrated by evaporation after drying over magnesium sulphate. The residue is chromatographed on a 25-fold quantity of aluminium oxide. Unconverted starting material is isolated with benzene and the compound 2-chloro-10-{3-[4-hydroxy-4-(2-oxo-3-tetrahydrofuryl)piperidino]propyl}phenothiazine is isolated with benzene/chloroform 2:1; after recrystallizing thrice from ethylmethylketone the compound has a M.P. of 152–154°.

EXAMPLE 9.—2-chloro-10-{3-[4-hydroxy-4-(2-oxo-3-tetrahydrofuryl)piperidino]propyl}phenothiazine A mixture of 9.3 g. of 2-chloro-10-(3-ethoxycarbonyloxypropyl)-phenothiazine and 5.1 g. of 4-hydroxy-4-(2-oxo-3-tetrahydrofuryl)piperidine is heated to 180° for 6 hours. The contents of the flask are subsequently dissolved in toluene, extracted several times with water and subsequently with a 10% tartaric acid solution. The acid extracts are made alkaline with potassium carbonate while cooling with ice and the liberated base is extracted with chloroform. After drying over magnesium sulphate the solvent is evaporated and the residue is chromatographed in a manner analogous to that indicated in Example 8. After recrystallizing thrice from ethylmethylketone pure 2-chloro-10-{3-[4 - hydroxy-4-(2-oxo-3-tetrahydrofuryl)-piperidino]-propyl}phenothiazine, having a M.P. of 152–154°, is obtained.

The 2 - chloro-10-(3-ethoxycarbonyloxypropyl)phenothiazine used as starting material is produced as follows:

A mixture of 29.2 g. of 2-chloro-10-(3-hydroxypropyl)phenothiazine, 10.8 g. of chloroformic acid ethyl ester and 6.8 g. of sodium ethylate in 400 cc. of absolute toluene is heated to the boil while stirring for 24 hours. Dilute hydrochloric acid is added to the mixture until a weakly acid reaction is obtained and the organic phase is decanted, dried over magnesium sulphate, the solvent is evaporated and the residue is chromatographed on a twenty-fold quantity of aluminium oxide. Elution with benzene/petroleum ether 1:4 yields crude 2-chloro-10-(3-ethoxycarbonyloxypropyl)phenothiazine as a viscous oil.

What is claimed is:
1. A phenothiazine derivative of the formula:

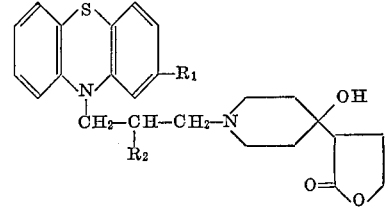

wherein $R_1$ is hydrogen, chlorine, bromine, trifluoromethyl cyano or lower alkanoyl, and $R_2$ is hydrogen or methyl, and a pharmaceutically acceptable acid addition salt thereof.

2. A compound according to claim 1, which is 2-chloro-10-{3-[4 - hydroxy-4-(2-oxo-3-tetrahydrofuryl)piperidino]propyl}phenothiazine.

3. A compound according to claim 1, which is 2-acetyl-10-{3-[4-hydroxy-4-(2-oxo - 3 - tetrahydrofuryl)piperidino]propyl}phenothiazine.

4. A compound according to claim 1, which is 2-bromo-10 - {3-[4-hydroxy-4-(2-oxo-3-tetrahydrofuryl)piperidino]propyl}phenothiazine.

5. A compound according to claim 1, which is 10-{3-[4-hydroxy-4-(2-oxo - 3 - tetrahydrofuryl)piperidino]propyl}phenothiazine.

6. A compound according to claim 1, which is 10-{3-[4-hydroxy-4-(2-oxo - 3 - tetrahydrofuryl)piperidino]propyl}-2-trifluoromethyl-phenothiazine.

7. A compound according to claim 1, which is 2-cyano-10-{3-[4-hydroxy-4-(2-oxo - 3 - tetrahydrofuryl)piperidino]propyl}phenothiazine.

8. A compound according to claim 1, which is 2-chloro-10-{3-[4 - hydroxy-4-(2-oxo-3-tetrahydrofuryl)piperidino]-2-methylpropyl}phenothiazine.

References Cited
UNITED STATES PATENTS 3,150,129   1964   Jacob et al. _____ 260—243

HENRY R. JILES, Primary Examiner

H. I. MOATZ, Assistant Examiner

U.S. Cl. X.R.

260—294.3; 424—247